J. CANTELO.
Water-Valve.

No. 207,712.    Patented Sept. 3, 1878.

WITNESSES
F. L. Ouraud,
P. McNickle

INVENTORS
James Cantelo
By L. Deane
Attorney

UNITED STATES PATENT OFFICE.

JAMES CANTELO, OF CEDAR RAPIDS, IOWA.

IMPROVEMENT IN WATER-VALVES.

Specification forming part of Letters Patent No. 207,712, dated September 3, 1878; application filed July 15, 1878.

*To all whom it may concern:*

Be it known that I, JAMES CANTELO, of the city of Cedar Rapids, county of Linn, and State of Iowa, have invented certain new and useful Improvements in Water-Valves, of which the following is a specification:

My invention relates more especially to that class of water-valves used upon railroad-tanks, although valves made in similar design are applicable to all purposes and places where the flow of liquids or air is sought to be arrested.

The object of this invention is to present a valve which shall have, in the greatest degree, the merits of cheapness in manufacture, durability, and effectiveness in stopping all leakage, whether the pressure upon it be great or comparatively small.

It consists of an ordinary valve-seat and a valve provided with an annular cavity corresponding in dimension to the seat, over which is fastened a gasket, thus forming within the said cavity a cushion of air, which serves to press the gasket into any slight irregularities of surface existing in the seat, and secure a perfect air-tight union without the use of great pressure.

It further consists in an improved form of lifting-lever and manner of keeping the valve in the same relative position to the lever, whether the device is open or closed, together with an improved form of valve-seat, all of which will appear by reference to the following particular description.

Figure 1:
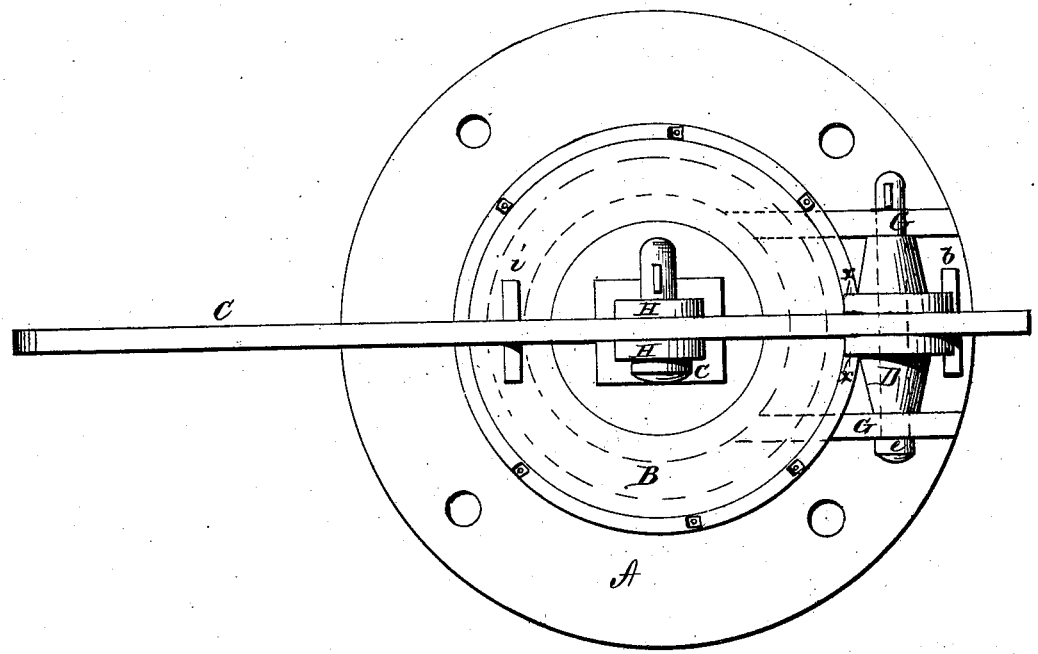
Figure 2:
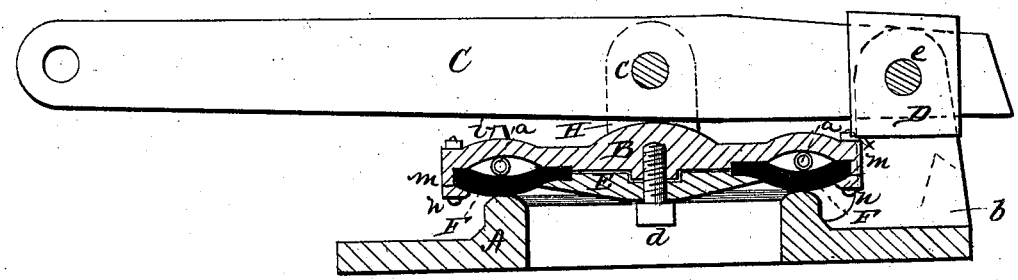

In the accompanying sheet of drawings, Figure 1 represents a plan view of my invention, and Fig. 2 a cross-section of the same.

Similar letters of reference indicate corresponding parts.

A represents the valve-seat. It is made in the general form of many now in use. Lugs G G are provided upon the surface at one side to afford a fulcrum for the lever C. A stop, b, is also interposed between the lugs to prevent the lever being raised too far. It is indicated by a dotted line in Fig. 2.

The bearing-surface of the valve-seat is made crowning, as shown in Fig. 2, the obvious effect of which is to secure a perfect union with the valve with less pressure than would be required were it made with a plane surface.

B shows the valve, provided also with lugs H H, through which a pin, c, passes and joins the valve to the aforementioned lever. By reference to Fig. 2 it will be seen that a portion of the valve which corresponds to the seat is made concave on the face of the valve which is presented to the seat. Over this cavity is placed the gasket F F. This may be made crowning, as in the figure, or plane, as may seem most expedient.

In the drawing referred to, the end of a piece of rubber pipe is shown by letters a a. The only purpose it serves is to distend the gasket into the form indicated, and its use is therefore optional. A ring, m, holds the outer edge of the gasket snugly to the valve, and a washer, E, performs a similar office on the inner edge. I do not desire to confine myself to the use of this means of holding the gasket in place, but claim the right to exclude from others the use of this or equivalent means for effecting the principal object—viz., an air-cushion for the purpose named.

The advantage arising from this improvement is so important as to deserve attention. By the use of it an air-tight junction is always secured without the great care in the fitting of the valve-seat which would otherwise be required. My invention admits of the valve-seat being either chilled or left in the natural condition in which it may be cast. The considerable expense incident to dressing the same is thus entirely avoided. Many of the valves now in use, whether perfectly fitted at first or not, are liable to leak from the imperfect condition of the gasket pressed between two unyielding surfaces. It is to do away with this difficulty and the vexation and expense natural thereto, that the means represented herein have been employed.

The lever C used in my invention is a simple bar of iron left straight, and provided with suitable holes for the fulcrum-pin e and the connecting-pin c. One end is slightly tapered, and this, passing through a corresponding slot in the hinge-piece D, is held in place by pin e extending through both hinge-piece and bar, and also through lugs G G. Cheapness in manufacture is thus secured as well as perfect action, the length of the bearing between the lugs preventing any side shake of the lever.

By reference to Fig. 2 it will be seen that the edge of the valve B extends under one corner of the hinge-piece D at $x$. By this means the natural tendency of the opposite side to fall as the lever raised is overcome, and the valve maintains throughout the extent of the lever's movement a position relatively the same as when closed. The effect of thus keeping the valve rigid is to bring valve and seat together squarely and without any wear and friction, as would be the case if it were left entirely free, one side striking the seat first and rubbing thereon as the other side is forced down. A projection, $i$, serves the same purpose on the opposite side.

It will be very apparent that by modifying the means of opening and closing the valve it may be applied to globe-valves, and indeed to all uses which these devices are intended to meet.

Having thus described my invention, what I claim as new, and desire to secure by Letters Patent, is—

1. The valve B, provided with an annular cavity or chamber, in combination with gasket F and ring $m$ and washer E, or their equivalents, substantially in the manner and for the purpose set forth.

2. The combination of valve B, as described, having gasket F, ring $m$, and washer E, with the seat A and lever C, substantially as and for the purposes set forth.

3. The lever C, pivoted at $c$, in combination with hinged piece D and pin $o$, and valve B, substantially as and for the purposes set forth.

In testimony that I claim the foregoing as my own, witness my hand this 9th day of July, A. D. 1878.

JAS. CANTELO.

Attest:
    J. M. St. John,
    Stephen Skinner.